United States Patent [19]

Wang et al.

[11] Patent Number: 4,528,202
[45] Date of Patent: Jul. 9, 1985

[54] PROCESS FOR MAKING SHREDDED POTATO PRODUCTS

[75] Inventors: Martha Y. Wang, Glen Rock; Jane Michnowski, Little Ferry; Diane L. Hnat, Lodi; Robert E. Ross, Wayne, all of N.J.

[73] Assignee: Nabisco Brands, Inc., Parsippany, N.J.

[21] Appl. No.: 490,752

[22] Filed: May 2, 1983

[51] Int. Cl.³ .................. A21D 2/36; A21D 6/00; A21D 8/02; A23L 1/216

[52] U.S. Cl. ..................... 426/550; 426/452; 426/463; 426/464; 426/560; 426/637; 426/808

[58] Field of Search ............. 426/285, 549, 550, 560, 426/618, 622, 637, 661, 438, 441, 452, 453, 454, 456, 464, 808, 463

[56] References Cited

U.S. PATENT DOCUMENTS

| | | | |
|---|---|---|---|
| 1,170,162 | 2/1916 | Kellogg | 426/452 X |
| 1,197,297 | 9/1916 | Kellogg | 426/452 X |
| 2,421,216 | 5/1947 | Penty | 426/621 |
| 2,481,122 | 9/1949 | Kaufman et al. | 426/456 X |
| 3,021,224 | 2/1962 | Stagmeier | 426/452 X |
| 3,136,643 | 6/1964 | Reeves et al. | 426/456 X |
| 3,391,003 | 7/1968 | Armstrong et al. | 426/285 |
| 3,512,990 | 5/1970 | Slaybaugh | 426/808 X |
| 3,565,636 | 2/1971 | Hutchings et al. | 426/637 X |
| 3,622,355 | 11/1971 | Beck et al. | 426/637 X |
| 3,830,943 | 8/1974 | Hix et al. | 426/637 |
| 3,835,222 | 9/1974 | Wisdom et al. | 426/438 X |
| 3,886,291 | 5/1975 | Willard | 426/808 X |
| 3,975,549 | 8/1976 | Shatila et al. | 426/456 X |
| 4,004,035 | 1/1977 | Hirzel et al. | 426/452 X |
| 4,310,560 | 1/1982 | Doster et al. | 426/456 X |
| 4,394,394 | 7/1983 | Nava et al. | 426/456 X |

Primary Examiner—Arthur L. Corbin
Attorney, Agent, or Firm—Richard Kornutik

[57] ABSTRACT

Ready-to-eat shredded potato products having a pleasant texture, and a substantially uniform off-white to golden tan color, are obtained by the process of the present invention. A potato dough is formed under low temperature and low shear mixing conditions so as to avoid overgelatinization of the potato starch and tackiness which would impede flowability and the continuous production of long continuous shred layers. Individual discrete dough pieces having a moisture content of from about 29% to about 50% by weight are tempered to distribute the water substantially uniformly throughout the dough pieces, the tempered dough pieces are shredded and the shredded dough is cooked.

30 Claims, No Drawings

PROCESS FOR MAKING SHREDDED POTATO PRODUCTS

BACKGROUND OF THE INVENTION

1. Field of the Invention

This invention relates to the production of shredded potato food products and to the products obtained thereby.

2. Description of the Prior Art

In the production of a cracker or biscuit from potato flour "checking" or the formation of hairline cracks due to water migration during and subsequent to baking is an acute problem. While checking is a problem common to the production of biscuits based upon cereal grains, such as wheat, rice, corn and the like, the phenomenon occurs to a greater extent in attempting to produce a biscuit from a potato dough. Potato doughs tend to form a more brittle product upon baking than do other doughs. Accordingly, hairline cracks due to checking have a greater tendency to propagate and result in a broken product.

The shredding process however, incorporates an open or webbed configuration into the product. The large surface area resulting from the production of shreds permits easier escape of water. Additionally, the escape of water from the product is more uniform. It is, accordingly, less stressful and does not lend itself to checking.

The moisture content of raw potatoes is too high for shredding. Potatoes typically have a moisture content of from about 70% to about 80% by weight, based upon the weight of the potato. In attempting to shred raw potatoes, long continuous shreds cannot be obtained. The potatoes become mushy upon shredding. Cooking of the whole potato does not substantially reduce the moisture content of the potato and does not impart a consistency to it which would enable the continuous production of shreds.

Several processes are known for the production of ready-to-eat breakfast cereals which are in shredded form. Cereal grains, however, as opposed to potatoes are of a size which is suitable for shredding. In conventional processes for producing shredded cereals, the grain is cooked and then permitted to temper to increase shred strength. Tempering of the cooked grains prior to shredding has generally been considered necessary for obtaining strong, continuous shreds. In U.S. Pat. Nos. 548,086 and 1,159,045, cooked wheat or similar grains are subjected to tempering times of over 12 hours before shredding. As described in U.S. Pat. No. 4,179,527, in the manufacture of a whole wheat food product such as shredded wheat, whole wheat is cooked sufficiently to gelatinize the starch. Gelatinization is a function of water penetration into the whole berry, temperature, and time, for a given type of grain. According to U.S. Pat. No. 4,179,527, the gelatinization of wheat starch involves a destruction of bonds in the crystalline regions of starch granules. Retrogradation is the return of the starch molecules to a crystalline structure, which is different from the original crystalline structures, upon cooling. Tempering permits the gelatinized wheat starch to slowly cool and permits water migration through the wheat particles to achieve a uniform water distribution within the particles. Retrogradation occurs during tempering. As reported in U.S. Pat. No. 4,179,527, if shredding is attempted shortly after cooking, the insufficient degree of retrogradation or tempering results in at best, short noncontinuous strands and/or strands which are tough, curly, or suffer from other physical or textural disadvantage. In U.S. Pat. No. 4,179,527, the time required for the tempering of cooked whole wheat is substantially reduced by chilling the wheat at a temperature of from 1° C. to about 12° C.

Numerous other processes for producing shredded cereal products with reduced tempering times or without any apparent tempering are also known. Shredded cereal products, whether tempering is used or not, have also been produced by shredding the cereal in a form other than its cooked berry form.

Processes wherein tempering is not specifically mentioned or is indicated as being optional in the production of cereals from wheat or other grains, are disclosed in U.S. Pat. Nos. 1,189,130, 2,008,024, 1,946,803, 502,378, 897,181, 3,062,657, 3,462,277, 3,732,109 and Canadian Pat. No. 674,046.

In U.S. Pat. No. 1,189,130, thoroughly moistened bran, such as wheat bran, is mixed with up to 50% of whole wheat or other gelatinous cereal flour or starch-bearing material, and is cooked in pans in a steam retort. The cooked product is dried to a lumpy condition, the lumps are pressed through a vial mesh and the resulting rice sized lumps are then fed through shredding mills.

In U.S. Pat. No. 2,008,024, a cereal biscuit is prepared by steaming or boiling wheat alone or with other forms of cereal or food material, surface drying the cooked product, and then converting it into a thin ribbed sheet. The shredding rolls are spaced sufficiently apart so that a sheeted material with ribs is obtained instead of a shredded product.

In U.S. Pat. No. 1,946,803, rice, alone or in combination with bran, is steam cooked, dried and cooled to a rubbery consistency, ground and optionally tempered to effect a uniform water distribution. This product is then passed between grooved rollers to form long flat ribbons. These ribbons are dried to produce a brittle product which is broken and then puffed by toasting.

In U.S. Pat. No. 502,378, a cereal grain is prepared for shredding by boiling, steaming, steeping or soaking. Depending upon the spacing between the rollers, a product in the form of threads, lace, ribbons, or sheets, and the like, is obtained.

In U.S. Pat. No. 897,181, cereal grain or vegetable in whole form is wetted but not cooked and then passed repeatedly between grooved rollers and then baked. Boiling or steaming of the grain or vegetable, it is disclosed, produces considerable change in its chemical quality and a number of the nutritious soluble elements escapes to the water.

In the processes of the remaining four patents, a shredded product is not produced by means of shredding rolls. In U.S. Pat. No. 3,062,657, flour and water are mixed to form a dough in an extruder. The dough is cooked in the extruder and then tempered in the extruder at a lower temperature. The extrudates are cut into pellets to simulate cooked and dried grains such as corn grits, whole wheat berries, oat groats, rice and the like. The extrudates, it is disclosed, have a moisture content ideal for flaking. It is generally on the order of 18 to 24% by weight, the moisture being uniformly distributed throughout so that the necessity for tempering is entirely eliminated and the extrudate can be immediately transferred to a flaking operation. It is disclosed that it is preferable to further cool the extrudate before it enters the flaking device to optimize flaking properties.

In U.S. Pat. No. 3,462,277, a mixture of cereal flour or grits and water is passed through an extruder to gelatinize the starch while the dough is cooked and transformed into a rubber-like mass. The moisture content of the mixture is 13 to 35%. The continuous U-shaped extrudate is pinched off into segments by cutting rolls to form canoe-shaped cereal products. The separated canoe-shaped pieces are then dried to below 15% moisture.

U.S. Pat. No. 3,732,109, discloses the production of a ready-to-eat oat cereal biscuit by subjecting an oat flour-water mixture to a water boiling temperature and superatmospheric pressure to gelatinize a portion of the starch in the oat flour. The mixture then passes through an orifice and the extruded product is cut into small pieces. The flake-shaped pieces which are formed are dried to a moisture content of from about 2% to about 6% by weight water. The dried flakes are then subdivided, admixed with a syrup, and compacted into the form of a biscuit. The formed biscuits are then dried to a moisture content of from about 4 to 5% by weight.

In Canadian Pat. No. 674,046, a shredded dry oat cereal product is produced without the use of shredding rolls. A dough is cooked in a screw extruder, extruded through orifices to form a strand bundle, and the strand bundle is cut into pieces by a cutting device which may be a pair of rolls.

Processes for the production of shredded cereals from cereal grains wherein considerable tempering is used, as in the conventional process for the production of shredded wheat, are disclosed in U.S. Pat. Nos. 1,159,045, 1,170,162, 1,197,297, and 4,004,035. In U.S. Pat. Nos. 1,159,045, 1,170,162 and 1,197,297, the whole berry is pulverized so as to permit flavoring ingredients to be incorporated in the final product. A dough is formed from flour, flavoring, and water. The dough is then cooked, rolled into slabs and then atmospherically dried for a period of 24 to 40 hours. The dried product is toasted, broken into pea size pieces, dried and then shredded. In U.S. Pat. No. 4,004,035, it is disclosed that during the continuous production of shredded biscuits using a press type cutter or rotating contact cutter, to sever the web across the shreds, the tensile strength and stickiness of the shredded material limits the ability of these cutting devices to perform satisfactorily. The shredded material, it is disclosed, tends to adhere to the blade or the blade will not completely sever it. In U.S. Pat. No. 4,004,035, the shredded biscuits are formed by depositing a layer of shredded cereal in zig-zag configuration on a moving belt and then severing the material. In addition to whole wheat, other foods capable of being shredded, such as other cooked cereal, wheat germ, defatted soy, other vegetable protein, fruits, vegetable slurries and mixtures thereof may be employed in producing the biscuits. The food is softened by cooking and tempering prior to shredding.

In the production of shredded cereals by means of shredding rolls, obtaining the cooked cereal in a form which will produce continuous shreds is only one of several problems which are encountered.

Cooking to eliminate white centers in grains is taught in U.S. Pat. No. 2,421,216. Particles of cereal grains such as corn, rye, wheat, bran, rice, or oat groats are composited with particles of de-fatted soya beans in the form of grits, flakes, or meal to enhance the protein content of the cereal by use of a two-stage pressure cooking step.

The total cooking period to which the cereal component is subjected to should, according to U.S. Pat. No. 2,421,216, be such that the starches are hydrolyzed and highly dextrinized and the particles superficially gelatinized with no free starch or white center. The cereal particles, it is taught, should also have a light adhesive action of the intermediately added soya bean particles. The mixed mass of cereal and soys which is removed from the cooker, has a moisture content from about 30 to about 45%. This mass is then dried to a moisture content of from about 24 to about 32% using air at about 130° F. The dried mass is then tempered for about 15 to 30 minutes before shredding in a shredding mill wherein the particles of soya become substantially uniformly spread out over and mixed with the cereal particles and adhered thereto by pressure through the shredding rolls.

In U.S. Pat. No. 3,512,990 a dough, made from farinaceous materials such as wheat, corn, oats, rice, potatoes, or legumes, is optionally partially or completely cooked with added moisture, to an approximate moisture content of about 30%. After this cooking step, the mixture is rendered homogeneous by passing it through an extruder or a hammer mill, such as Fitzmill. The milled or extruded product is dried to an approximate moisture content of 22 to 24%. The dried dough is then compacted between two rolls to provide a shredding effect and produce a sheet of dough having diamond-like regularly spaced perforations. The sheet of dough is then severed into strips, folded to form small biscuits which are closed on three sides and then deep fried.

In U.S. Pat. Nos. 987,088, 1,019,831, and 1,021,473, corn or another grain is ground and immersed in an amount of water which is limited to that which will be taken up by the grain during cooking. The purpose of this is to preserve in the cooked article the aroma and other properties of the grain which might otherwise be carried off or dissipated by the evolution of steam or vapor. In these processes, the cooked dough is extruded through a perforated plate to obtain filaments.

In U.S. Pat. No. 4,310,560 particulate edible materials, including at least one material which acquires surface stickiness when moistened and a chemical leavening system are contacted with a spray of water and formed into pellets on a pelletizing disk. The edible material may include starches, such as those derived from wheat, corn, rice, potatoes, tapioca, and the like, including pregelatinized starches. The pellets are heated to a temperature sufficient to effect reaction of the leavening system to release carbon dioxide to provide the pellets with a porous cellular structure.

However, in the production of shredded potato products, heating or cooking of the potatoe starch in the presence of water prior to shredding leads to the formation of gel-like or rubbery material and tacky substances which hampers the continous production of discrete potato particulates or dough pieces. High shear mixing of a potato starch source and water generates heat which overgelatinizes potato starch and forms a well-worked dough which is difficult to form into particulates. Shredded potato products made from such a dough tend to delaminate subsequent to or during cooking. Additionally, unless the dough pieces are tempered to distribute the water substantially uniformly throughout the dough pieces, the dough pieces will tend to accumulate at the feed hoppers and shredding rolls after several hours of operation inhibiting a continuous process.

The present invention provides a process for the production of ready-to-eat shredded potato products made from potatoes alone, or in combination with at least one cereal grain, which have a pleasant mouthfeel, have a substantially uniform off-white to golden tan color, have a pleasant potato taste, and which do not delaminate. Potato particulates or dough pieces are produced in the form of discrete, individual or non-interconnected particles which have good flowability through material handling equipment, do not stick to or accumulate in hoppers or on the shredding rolls, and are readily shreddable into strong continuous shreds on a consistent basis.

SUMMARY OF THE INVENTION

The process for producing the ready-to-eat shredded potato products of the present invention comprises combining at least one potato starch source with water under low temperature and low shear mixing conditions so as to avoid overgelatinization of the potato starch and to form individual discrete dough pieces or particles, tempering the dough pieces for at least about two hours to distribute the water substantially uniformly throughout the dough pieces, shredding the tempered dough pieces, and cooking the shredded dough. Producing substantially homogeneous dough pieces without first producing a dough mass is an efficient means for large scale production of dough pieces with minimal gelation problems. The at least one potato starch source and any other dry ingredients are premixed and then sprayed with water while being tumbled in a low shear mixing device, such as a horizontally oriented paddle-type mixer or a disk or drum pelletizer, operated under atmospheric temperature and pressure conditions. Tempering is necessary to provide continuous flowability of the dough pieces into and through feed hoppers and the shreeding rolls. The shredded potato products can be cooked by frying or by baking. The at least one potatoe starch source is preferably commercially available dehydrated potatoes in comminuted or particulate form or pregelatinized potato starches or flours. Cooking of the at least one potato starch source in the presence of water is not performed until after the shredded product is formed so as to avoid overgelatinization problems which would impair flowability to and through the shredding rolls. Shredded potato products made from at least one potato starch source and cereal grains can be made by admixing at least one cereal grain with the at least one potato starch source. Shredded potato products produced by the process of the present invention do not delaminate or exhibit checking during or subsequent to cooking. The cooked products have a pleasant substantially uniform off-white to golden tan appearance and a pleasant mouthfeel.

DETAILED DESCRIPTION OF THE INVENTION

The process for producing the shredded potato food products of the present invention comprises combining at least one potato starch source with water under low temperature and low shear mixing conditions to avoid overgelatinization of the potato starch, and to form discrete, individual or non-interconnected free-flowing potato dough pieces, tempering the dough pieces to distribute the water substantially uniformly throughout the dough pieces, shredding the tempered dough pieces, forming the shredded product into pieces, such as biscuits, and baking or frying the pieces. As used herein, the term "potato dough pieces" includes rehydrated potato pieces or particulates and is not limited to pieces obtained by admixing finely comminuted potato starch sources such as potato flour and/or potato starch with water.

Potato starch sources which can be utilized in the present invention are preferably in finely comminuted form or in particulate form so as to be readily hydratable. They include modified or unmodified potato flour, modified or unmodified potato starch, and dehydrated potatoes, all of which are commercially available. Commercially available dehydrated potatoes, potato flour, and potato starch typically have moisture contents of about 5% to about 8% by weight.

The more finely divided the at least one potato starch source, the more readily it hydrates and forms larger particles, pieces, or agglomerates. Typical forms of such readily rehydratable dehydrated potatoes are potato flakes and potato granules. Larger forms of dehydrated potatoes, such as potato dices and potato strips, can be used to produce shredded potato products. However, they must be soaked in water, typically two hours or more, to obtain a moisture content which is suitable for shredding. Once properly rehydrated and tempered, these larger forms can be shredded. The potato strips should have a length which is less than about 45 mm, preferably less than about 15 mm. The diced potatoes and the potato strips should have at least two dimensions which are less than about 10 mm, preferably from about 3 mm to about 5 mm.

Mixtures of potato starch sources are preferred for better texture control in the final product. For example, it has been found that a mixture of potato granules, potato starch and potato flour results in a more tender texture in the final product than is obtained with only potato flour. The mixtures of potato starch sources suitably contain from about 15% to about 55% by weight potato flour.

Commercially available shelf-stable forms of dehydrated potatoes, potato flour and potato starch are preferred. Storage of raw potatoes, peeling them, cutting and dehydrating the potatoes to a shreddable moisture level and then shredding is too costly and presents raw material storage problems in large scale production.

The at least one potato starch source should have a degree of gelatinization or be precooked to a degree which is sufficient to enable the formation of non-powdery pellets, agglomerates or dough pieces under low temperature, low shear mixing conditions in the presence of water. If the degree of pregelatinization or precooking is too low, agglomerates will not form or will break apart upon the application of light hand pressure. The processing of potatoes to produce commercially available forms of dehydrated potatoes involves sufficient precooking or pregelatinization for the formation of dough pieces. Commercially available pregelatinized potato flours and potato starches typically have a degree of gelatinization, or the weight percent of the starch which is gelatinized, of at least about 90%. However, potato starches or flours having lower degrees of gelatinization can be used to form the dough pieces.

The amount of water which is combined with the at least one potato starch source should be limited so as to achieve a moisture content of about 29% by weight to about 50% by weight, preferably from about 30% by weight to about 36% by weight, based upon the weight of the dough pieces at the end of the mixing step. If the water content of the dough pieces is increased over 50% by weight, shreddability and shred strength tend to decrease. The reduced shred strength results in breakage in attempting to produce continuous shred layers. If the water content of the dough pieces is less than about 29% by weight, the dough pieces tend to stick to the shredding rolls, thereby impeding and eventually preventing shredding of the dough pieces.

All mixing of the ingredients should be performed at room temperature or below about 85° F., to avoid overgelatinization of the potato starch. It is manifested in the formation of rubbery material and/or tacky material which hamper the formation of pieces of dough. Thus, cooking of the at least one potato starch source in the presence of water prior to shredding should be avoided. The water which is admixed with the at least one potato starch source should accordingly be cold water, suitably between about 40° F. and 60° F., typically about 50° F. Additionally, mixing of the water with the at least one potato starch source should be done under low shear mixing conditions so as to avoid the generation of heat which would overgelatinize the starch. It has been found that a potato dough produced under high shear mixing conditions results in shred layers which have inferior binding ability. Seams formed by cutting through a multiple layer product tend to come apart, or the product tends to delaminate during or after cooking.

Admixing the at least one potato starch ingredient with the water so as to form dough pieces, without forming a dough mass, facilitates materials handling and subjects the potato dough to minimal shear. For example, mixing the dough ingredients in an upright mixer to form a homogeneous dough mass would make continuous production of a shredded product unfeasible because the dough would have to be scooped out of the upright mixer and then transferred to grinding or pelletizing equipment.

A dough mass can be formed in an extruder which exhibits low shearing action so as to avoid the generation of substantial amounts of heat which would result in overgelatinization of the potato starch. The at least one potato starch source and other dry ingredients are premixed in a blender for example and fed to the extruder by means of a hopper. The water is fed into the extruder for combining with the dry ingredients. The substantially homogeneous potato dough is then cut into pellets as it exits from the extruder in conventional manner. Exemplary of a low shear, non-cooking extruder is a meat grinder. However, at throughputs which are high enough for commercial production, the mixing is non-uniform resulting in overworked rubbery material and powdery or insufficiently hydrated material.

To produce substantially homogeneous dough pieces without first producing a dough mass, the at least one potato starch source and any other dry ingredients are premixed and sprayed with water while being tumbled. Premixing of the dry ingredients can be performed in an upright blender or ribbon blender, for example. The premixed dry ingredients are then transferred by means of a hopper, for example, to at least one tumbling device. If more than one tumble device is used, they can be operated in series or parallel.

Horizontally oriented or inclined drums, equipped with a longitudinally oriented shaft having paddle-type mixers for low shear mixing, can be used for tumbling the dry ingredients. Spray nozzles, suitably located along the length of the mixing vessel, spray the water onto the dry ingredients as they tumble to form dough pieces. A rotating horizontally oriented or inclined drum equipped with spray nozzles along its horizontal axis can also be used. Rotating paddles may also be provided on a shaft along the horizontal axis of the rotating drum. Suitable low shear mixers are commercially available. Exemplary of such a device is the preconditioning barrel or barrels of a Wenger ® extruder which mix dries and liquids. The water nozzles can be located or operated at such a point or points in the system to control the contact time between the dries and the liquids to assure the attainment of appropriately hydrated material rather than unmixed water and potato starch source. To control the rate of flow more uniformly into the low shear dough or wet mixing device, the premixed dry ingredients can be tumbled in a low shear mixing device which serves as a surge vessel.

The residence time of the dough ingredients in the tumbling device should be such that the individual rehydrated potato particles or potato dough pieces are from about 1 mm to about 10 mm, preferably from about 3 mm to about 5 mm in diameter. The low shear horizontally oriented or inclined paddle-type mixing devices are preferred because of their ability to continuously produce dough pieces at a high production rate. The dough pieces obtained from these low shear mixers are preferably subjected to a size reduction operation so as to obtain dough pieces of more uniform size, preferably from about 3 to 5 mm in diameter. Conventional equipment, such as a Fitzmill, can be used for this purpose. The size reduction can be performed either before or after tempering of the dough pieces.

Another tumbling device for making the dough pieces without forming a dough mass is a disk or drum pelletizer. The at least one potato starch source and other dry ingredients are preblended in an upright blender, for example, and then transferred to the disk pelletizer. The disk pelletizer can be equipped with a low shear screw feeding device or other appropriate conventional equipment for regulating the rate of flow of dry ingredients into the disk. The dry ingredients are moistened as they are rolled and tumbled in the inclined, rotating drum or rotating disk. As the water is sprayed onto the tumbling and rolling dry ingredients, loose pendular, funicular and capillary bonds are generally formed between the grains of the material. This causes nucleation into small seeds and gradual growth by packing, densification and layering as the loose solids-air-water bond is replaced by a dense solids bond with a moisture film between particles. As more fines or dry ingredient particles are continuously fed into the pelletizer, generally spherical pellets of proper size are discharged over the edge of the drum, disk, or pan, while smaller pellets and growing seeds are retained in the bottom.

Pellet size is controlled in known manner by the angle and speed of the pelletizer and placement of the feed and location of the water sprays, as well as the amount of liquid added at any given location. The pellets are uniform in size due to the natural classification action of the disk or drum pelletizer. Usually subsequent screening or size reduction is therefore not needed.

The individual, discrete dough pieces are transferred, by means of a conveyor belt, for example, to a curing bin or tempering vessel, preferably equipped with rakes for automatic removal from large curing bins. The tempering vessel should be covered so as to avoid drying out of the dough pieces and so as to maintain a moisture content in the dough pieces of from about 29% to about 50% by weight, preferably from about 30% to about 36% by weight. The dough pieces are tempered so as to obtain a substantially uniform distribution of the water throughout each dough piece. Tempering is performed under atmospheric temperature and pressure conditions and should be for at least about two hours, preferably for at least about six hours. It is preferable to maintain the tempering temperature below about 85° F. Jacketed vessels, equipped with cooling means can be used for this purpose.

At tempering times below about two hours, flowability of the dough pieces into the feed hoppers of the shredding rolls becomes unsatisfactory. Tempering also results in a more evenly colored fried or baked product and results in less and/or more even oil absorbance. Additionally, after a few hours of operation, insufficiently tempered dough pieces begin sticking to the shredding rolls and eventually prevent the production of continuous shreds. Clumping of the potato dough in the shredding roll feed tubes or hoppers or on the shredding rolls, which causes the shredding rolls to run empty, results in overheating of the rolls. Overheating of the rolls to 150° F. results in hardening of the potato dough on the rolls. For the attainment of continuous, high quality shreds, the temperature of the shredding rolls, as measured with infra-red measuring equipment, should be below about 125° F. If the tempering times are too short, it is believed that surface water, resulting from insufficient water migration into the interior of the dough pieces, contains water soluble starches which deposit and slowly build up on the shredding rolls and in the feed hoppers.

Tempering times above about 36 hours tend to result in excess compaction and possible microbial problems. The dough pieces, when stored in large amounts for long periods of time in the tempering vessel, tend to compact into chunks. These chunks clog up the feed hoppers and subsequently the shredding rolls. Subjecting the chunks to size reduction, such as in a Fitzmill, solves this problem. Undesirable heat build up and odors due to microbiological activity may tend to occur at tempering times between about 36 and 48 hours. Accordingly, tempering times of about two hours to about 36 hours, preferably from about six hours to about 24 hours should be used.

The tempered potato dough pieces or tempered rehydrated potato pieces are suitably transferred by means of belt conveyors to a hopper which feeds a screw conveyor. In this arrangement, the screw conveyor transfers the tempered dough pieces to a series of conventional shredding rolls or mills which are each equipped with flow tubes or hoppers. Shredding systems which can be used in the process of the present invention may comprise conventional rolls and devices such as those indicated in U.S. Pat. Nos. 502,378, 2,008,024, 2,013,003, 4,004,035, and Canadian Pat. No. 674,046. A conventional shredding mill for use in the process of the present invention comprises a pair of closely spaced rolls that rotate in opposite directions, with at least one of the rolls having circumferential grooves. Upon passing between the rolls, the dough pieces are deformed into long individual strings or shreds. The circumferentially grooved roll can also be grooved transversely to the circumferential grooves for the production of net-like sheets. When the rollers are held to roll in mutual contact, the shreds or filaments will be fairly separate from each other, though more or less contacting, but when the rollers are sprung slightly apart, under pressure, the adjacent filaments may be united to each other by very thin translucent, almost transparent, webs or fins between them.

The shredding mills are typically arranged in a linear series along a common conveyor, with the shreds running longitudinally or in parallel with the direction of movement of the conveyor. The sheets or layers of filaments are deposited on the conveyor in super-position, with their filaments running in the same direction. A typical biscuit, for example, may contain from 1 to 6 individual layers of shreds. A baked product preferably contains 4 layers. A fried product preferably contains 3 layers. Upon obtaining the requisite thickness, the multiple layer web can be cut transversely and longitudinally into multiple lines of biscuits in known manner. The cutting can be completely through the laminate to form the individual biscuit shapes prior to cooking. Cutting partially through the laminate to form biscuit shapes, followed by cooking, and separating the cooked partially cut laminate into individual biscuits in known manner is preferred for easier control of the orientation of the cut product as it passes through a baking oven. Shapes formed by the cutting are preferably those which do not result in waste such as rectangular, square, and triangular. Dimensions typically range from about $\frac{3}{4}''$ to $1\frac{3}{4}''$.

Cooking of the shredded potato product can be by baking or frying. Drying or baking of the shredded potato prior to frying is not needed. Vegetable oils such as coconut oil, soybean oil, cottonseed oil, or peanut oil, conventionally used in the frying of potato chips, can be used to fry the shredded potato products of the present invention. The products are fried so as to obtain a substantially uniform light, off-white to golden tan color. Typical frying times and temperatures are about 5 to 30 seconds at temperatures of from about 350° F. to about 400° F. After frying, the product can be topped with salt or other flavorings in conventional manner and packaged. The final fried shredded product typically has a moisture content of from about 1% to about 4% by weight, based upon the weight of the final product. Conventional equipment used for the frying of potato chips can be used for frying the shredded potato products of the present invention.

In producing a baked shredded potato product, the shredded potato product is dried, baked, and toasted, in conventional equipment. Suitable ovens for drying, baking and toasting the shredded potato product include Proctor & Schwartz, Werner-Lehara, and Spooner ovens containing forced air and gas fired burners and a conveyor. Temperature profiles used in the oven for drying, baking and toasting of the shredded potato product are generally within the range of about 200° F. to about 450° F. The total time for drying, baking and toasting should be such so as to avoid browning. It depends upon the number of shred layers, the size of the shredded product and the type of oven. The total time for drying, baking and toasting typically ranges from about 5 minutes to about 25 minutes. The final product generally has a moisture content of about 1% to about 5% by weight, based upon the weight of the final product. The color of the final baked product should be a substantially uniform off-white to light golden tan color. The baked product can be topped with salt or other flavoring or spray oil by top and/or bottom spraying in conventional manner.

Cereal grains can be premixed with the at least one potato starch source to produce shredded potato products in accordance with the present invention. It has been found that shredded potato products which have the at least one potato starch source in an amount of as low as 25% by weight of the final product, still have a desirable potato taste. However, it is preferable to have the at least one potato starch source present in an amount of at least about 50% by weight, based upon the weight of the final cooked product, for enhanced potato flavor. Exemplary of cereal grains which can be used to provide texture variations are barley, rye, corn, wheat, rice, combinations thereof, and the like. When cereal grains are premixed with the at least one potato starch source, the mixing conditions, moisture content of the dough particles, tempering times, and cooking conditions should generally be the same as those described above. Adjustments, however, can be made to achieve optimum flowability and shreddability by slight changes in moisture content. Optimization of final product color and texture can be achieved by adjustments in cooking temperatures and times.

A shredded potato product having at least one cereal grain in each biscuit can also be prepared by separately processing each type of cereal grain in conventional manner and then co-shredding the cereal grains with the potato dough pieces. It is also possible to combine the cereal grains with the at least one potato starch source by separately shredding the cereal grains and the potato dough pieces followed by layering the shreds of the grains and the shredded sheets or layers of the potato dough.

The other grains can also be separately prepared for shredding by combining precooked or pregelatinized cereal flour or other particulate form of the cereal grain with water to form discrete dough pieces without forming a dough mass, in accordance with the process of the present invention.

In addition to cereal grains, one or more other food ingredients at the usual levels of concentration which do not interconnect the dough pieces or otherwise interfere with the attainment of individual discrete, free-flowing dough pieces for the continuous production of shreds can be included in the shredded potato products of the present invention. Any dry ingredients which are used are premixed with the at least one potato starch source and the optional cereal grain. For the attainment of substantially homogeneous dough pieces, the other dry ingredients, including the cereal grains, should have particle sizes which approximate the particle sizes of the at least one potato starch source. For example, if a potato flour or potato starch is used as the at least one potato starch source, the cereal grain should be in the form of flour. Liquid ingredients can be dissolved in the water and sprayed as an aqueous solution onto the tumbling dry ingredients. Exemplary of ingredients which can be used in the shredded potato products of the present invention are salt, malt, other flavorings, food colorant, emulsifiers, vitamins and/or minerals. However, products made from only potatoes are preferred because of their consumer appeal. The present invention is further illustrated in the following examples. All percentages, parts, or proportions are by weight and all temperatures are in °F. unless otherwise indicated:

EXAMPLE 1

The ingredients and their relative amounts used to produce a shredded potato product are:

| INGREDIENT | WEIGHT PERCENT |
| --- | --- |
| Potato Flour (pregelatinized, 7.6% moisture content) | 67 |
| Salt | 3 |
| H$_2$O (cold tap water) | 30 |
| | 100 |

The potato flour and the salt are premixed in an upright blender to achieve substantial homogeneity and transferred by means of a live-bottom hopper to a horizontal low shear double barrel Wenger® mixer equipped with axially displaced rotating paddle-type mixing elements. The first barrel feeds the mixed dry ingredients to the second barrel of said Wenger® mixer which is equipped with spray nozzles. The water is sprayed through the nozzles onto the tumbling dry ingredients so as to obtain individual, discrete dough pieces having a moisture content of about 35% by weight. The total flow rate of all the dry ingredients and the cold water to the second mixer is 340 g/sec. Each mixing step is performed at room temperature. The dough pieces are transferred to a curing bin, equipped with a raking device, which is then covered to avoid drying out of the dough pieces. The dough pieces are tempered in the curing bin at room temperature for 12 hours. The tempered dough pieces are then subjected to particle size reduction in a Fitzmill to obtain more uniformly sized discrete dough pieces. The dough pieces, which are approximately 3 to 5 mm in diameter are transported to a shredding line hopper and shredded in a conventional shredder having a five-inch chain conveyor. A shred layer about 4½ to about 5 inches wide is obtained. A laminate of the shred layers is formed and cut and shaped by a wheel in-line to obtain spoon-sized pieces. Each piece is formed from four shred layers and is approximately ¾" square. These pieces are then dried, baked and toasted in a multizone band oven for about 19 minutes at a temperature of about 300° F. at the entrance end and about 200° F. at the exit end to produce baked spoon-sized shredded potato biscuits having a moisture content of about 2.5% based upon the weight of the final biscuit product. The moisture content is determined on a Brabender moisture meter set at 145° C. for 15 minutes.

The shred quality is strong and the shred layer pattern is the same as the shred pattern of shredded wheat.

EXAMPLE 2

This example is carried out in a similar manner as Example 1 except that the premixed potato flour and salt is fed from the upright mixer to a screw conveyor of a disk pelletizer. The screw conveyor feeds the dry ingredients to an inclined rotating disk. As the dry ingredients tumble in the disk, the water is sprayed by means of nozzles onto the flour. Discrete dough pieces ranging in diameter of from about 3 to 5 mm are obtained at the bottom portion of the disk and are fed to the curing bin and cured as in Example 1. The cured dough pieces are transported directly to the shredding rolls without Fitzmilling. The dough pieces are shredded into layers, the layers are laminated, the laminated product is cut into pieces and the pieces are baked as in Example 1.

EXAMPLE 3

The procedure of Example 1 is repeated except that the dough pieces are tempered six hours, a laminate of three shred layers is formed, and the spoon-sized pieces are then fried in vegetable oil to a golden tan color. The final moisture content of the fried product is 2.5% by weight.

EXAMPLE 4

The ingredients and their relative amounts used to produce a shredded potato product are:

| INGREDIENT | WEIGHT PERCENT |
|---|---|
| Potato Granules (7.1% moisture content) | 43 |
| Potato Starch (pregelatinized, 7.0% moisture content) | 6 |
| Potato Flour (precooked, 7.6% moisture content) | 20 |
| Salt | 2 |
| Water (cold) | 29 |
| | 100 |

All of the ingredients, except for the water are dry-blended in an upright mixer to obtain a substantially homogeneous mixture. The preblended mixture and the cold water are combined as in Example 1 to obtain individual, discrete dough pieces having a moisture content of about 34% by weight. As in Example 1, the dough pieces are tempered, subjected to particle size reduction in a Fitzmill, shredded into layers, the layers are laminated and cut to obtain spoon-sized pieces, and the pieces are dried, baked and toasted to a moisture content of about 2.5% based upon the weight of the final biscuit product.

The shred quality is strong and the shred layer pattern is the same as the shred pattern of shredded wheat.

EXAMPLE 5

Example 4 is repeated except the ingredients and their relative amounts are:

| INGREDIENT | WEIGHT PERCENT |
|---|---|
| Granular Potato Flour | 43 |
| Corn Flour | 30 |
| Water (Cold) | 27 |
| | 100 |

The discrete dough pieces have a moisture content of about 32% by weight and a baking time of 25 minutes instead of 19 minutes is used in Example 5.

EXAMPLE 6

Example 1 is repeated except the tempered dough pieces are mixed with cooked and tempered wheat berries to form a substantially homogeneous mixture which is then shredded. The weight ratio of the potato dough pieces to the wheat berries is 60:40. The moisture content of the total mixture is about 36% by weight. The spoon-sized pieces are baked for 25 minutes instead of 19 minutes.

What is claimed is:

1. A process for producing a ready-to-eat potato food product comprising:
   (a) combining at least one source of potato starch with water to form discrete dough pieces without forming a dough mass, said pieces having a moisture content of from about 29% to about 50% by weight,
   (b) tempering the pieces to distribute the water substantially throughout the pieces, and
   (c) shredding the tempered pieces by passing them between counterrotating shredding rolls, at least one of which is grooved.

2. A process as claimed in claim 1 wherein forming the pieces of step (a) comprises spraying the at least one potato starch source with the water while the at least one potato starch source is tumbled to form agglomerates.

3. A process as claimed in claim 2 wherein the agglomerates are formed in a disk pelletizer.

4. A process as claimed in claim 2 wherein the at least one potato starch source is mixed in a mixing vessel and transferred to at least one agitated vessel, and the agglomerates are formed in said at least one agitated vessel.

5. A process as claimed in claim 4 wherein the agglomerates are treated to obtain pieces which are substantially uniform in size prior to shredding.

6. A process as claimed in claim 5 wherein said treatment of the agglomerates is subsequent to said tempering.

7. A process as claimed in claim 4 wherein the at least one potato starch source is tumbled in said mixing vessel to control the flow rate during transfer of the at least one potato starch source to said at least one agitated vessel.

8. A process as claimed in claim 7 wherein the at least one potato starch source and other dry ingredients are premixed and then fed to said mixing vessel.

9. A process as claimed in claim 8 wherein said other dry ingredients comprise at least one cereal flour or at least one flavor enhancer.

10. A process as claimed in claim 9 wherein the shredded potato food product comprises at least about 50% by weight of the at least one potato starch source.

11. A process as claimed in claim 10 wherein said food product comprises shredded potato and at least one shredded cereal grain.

12. A process as claimed in claim 11 wherein the cereal grain is barley, rye, wheat, corn, rice, or mixtures thereof.

13. A process as claimed in claim 2 wherein the tempered pieces are shredded into individual sheets, the sheets are layered, the layered product is cut, and the cut product is cooked.

14. A ready-to-eat shredded potato product obtained by the process of claim 13.

15. A ready-to-eat shredded potato product as claimed in claim 14 which is baked.

16. A ready-to-eat shredded potato product as claimed in claim 14 which is fried.

17. A ready-to-eat shredded potato product as claimed in claim 14 which comprises at least 50% by weight potato.

18. A process as claimed in claim 1 wherein the amount of water added in step (a) is limited to achieve a moisture content in the pieces of from about 30% to about 36% by weight, based on the weight of the pieces.

19. A process as claimed in claim 1 wherein the pieces are tempered for about 6 hours to about 24 hours.

20. A process as claimed in claim 1 wherein said at least one potato starch source is at least partially pregelatinized.

21. A process as claimed in claim 1 wherein said at least one potato starch source comprises between about 15% to about 55% by weight of potato flour, based upon the weight of the at least one potato starch source.

22. A process as claimed in claim 1 wherein said at least one potato starch source is potato flour, dehydrated potato pieces, potato starch or mixtures thereof.

23. A process as claimed in claim 22 wherein said dehydrated potato pieces are in the form of flakes, granules, dices, strips or mixtures thereof.

24. A process as claimed in claim 1 wherein step (a) is conducted at a temperature of less than about 85° F.

25. A process as claimed in claim 1 wherein said shredded potato food product consists essentially of shredded potato.

26. A process as claimed in claim 1 wherein the shredded product is fried.

27. A process as claimed in claim 1 wherein the shredded product is baked.

28. A process for producing a shredded ready-to-eat potato product comprising:

(a) combining at least one potato starch source with water under low temperature and low shear mixing conditions so as to avoid overgelatinization of the potato starch and to form discrete dough pieces without forming a dough mass, said pieces having a moisture content of about 29% to about 50% by weight, (b) tempering the dough pieces of step (a) to distribute the water substantially uniformly throughout the dough pieces, (c) shredding the tempered dough pieces by passing them between counterrotating shredding rolls, at least one of which is grooved, and (d) cooking the shredded dough.

29. A process as claimed in claim 28 wherein the at least one potato starch source is substantially pregelatinized and the shredded dough is cooked by baking.

30. A process as claimed in claim 29 wherein the dough pieces of step (a) are formed in a disk or drum pelletizer.

* * * * *